(12) United States Patent
Bernard et al.

(10) Patent No.: US 6,741,642 B1
(45) Date of Patent: May 25, 2004

(54) ENHANCED CONSTELLATION DISPLAY FOR VSB TELEVISION SIGNALS

(75) Inventors: Kyle L. Bernard, Tigard, OR (US); Xiaofen Chen, West Linn, OR (US); Thomas L. Kuntz, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/055,049

(22) Filed: Apr. 3, 1998

(51) Int. Cl.[7] .................................................. G06F 11/00
(52) U.S. Cl. ...................................................... 375/228
(58) Field of Search ................................. 375/224, 228, 375/270, 301, 321, 340, 261; 329/357; 332/170; 315/370, 382.2; 348/806, 807

(56) References Cited

U.S. PATENT DOCUMENTS

| | | | | |
|---|---|---|---|---|
| 4,639,934 A | * | 1/1987 | Zuranski et al. | ............ 375/261 |
| 5,060,279 A | * | 10/1991 | Crawford et al. | ............. 382/14 |
| 5,747,933 A | * | 5/1998 | Beeteson et al. | ............ 348/806 |
| 5,872,432 A | * | 2/1999 | Beeteson | .................. 315/382.1 |

FOREIGN PATENT DOCUMENTS

EP          0 801 510 A2     *  10/1997

OTHER PUBLICATIONS

Sgrignoli, G; Bretl, W. and Citta, R., "VSB Modulation Used for Terrestrial and Cable Broadcasts," *ICCE95GS.DOC*, Jun. 1995, pp. 1–16.

* cited by examiner

*Primary Examiner*—Tesfaldet Bocure
(74) *Attorney, Agent, or Firm*—Francis I. Gray; John Smith-Hill

(57) ABSTRACT

A modulation analyzer includes a smoothing processor which processes the coordinates of symbol landing points to generate a curve that optimally fits the landing points under a selected criterion.

11 Claims, 2 Drawing Sheets

ENHANCED CONSTELLATION DISPLAY FOR VSB TELEVISION SIGNALS

BACKGROUND OF THE INVENTION

This invention relates to an enhanced constellation display for VSB television signals.

G. Sgrignoli, W. Bretl and R. Citta, "VSB Modulation Used for Terrestrial and Cable Broadcasts," *ICCE95GS.DOC*, June 1995, pages 1–16, the disclosure of which is hereby incorporated by reference describes a vestigial sideband (VSB) digital transmission system for terrestrial and cable television broadcasting. One implementation of this VSB digital transmission system is referred to as a trellis-coded 8VSB system. In the trellis-coded 8VSB system, the digital data signal is divided into segments each having a duration of 77.3 $\mu$s and each segment is divided into 832 symbol intervals, each occupying about 0.09 $\mu$s. Four of the symbol intervals in each segment are used for segment sync.

FIG. 1 is a simplified schematic block diagram illustrating the transmitter for a trellis-coded 8VSB system. As shown in FIG. 1, digital video, audio and ancillary data are combined and processed by a processor 10 in the manner described in the article cited above and in other documents describing the ATSC digital television standard and the resulting data stream is supplied to a trellis encoder 14, which generates a baseband output signal having one of eight levels during each symbol interval. Thus, three bits of data can be represented by a single symbol. A multiplexer 18 multiplexes the data symbols with segment sync and frame sync and provides a composite baseband data signal. The composite baseband signal is passed through an I-channel root raised cosine filter 20I and a Q-channel root raised cosine filter 20Q to a quadrature modulator 22 which uses the I and Q channel baseband data signals to modulate two carrier signals at the same frequency (typically 44 MHz) and in phase quadrature. The quadrature modulator 22 includes a summing element which adds the two modulated carrier signals together to form the 8VSB signal. The 8VSB signal is supplied to an RF upconverter 26 which translates the 8VSB signal to the desired RF channel. The RF signal drives an antenna 30.

At the receiver, the received RF signal is downconverted to an intermediate frequency and the IF signal is digitized and demodulated. Since the transmitted signal is a vestigial sideband signal and the baseband signal is complex, demodulation provides separation of in-phase (I) and quadrature (Q) components. Data is recovered from the I component by equalizing and slicing at eight levels. The recovered data is processed to separate video, audio and ancillary data.

Data cannot be directly recovered from the Q component of the demodulated signal. However, useful information regarding the propagation path of the data can be attained from the Q component by equalizing the Q component in conjunction with equalizing the I component and plotting the I and Q values for each symbol in a segment along the axes of a rectangular Cartesian coordinate system, so that each symbol is represented by a single dot or landing point. The landing points are typically displayed against a graticule composed of eight straight lines extending parallel to the Q axis and corresponding to the eight data levels respectively. The display of landing points is referred to as a constellation display.

FIG. 2 shows the traditional constellation for an 8VSB data segment with the Q axis vertical and the I axis horizontal. The eight straight lines of the graticule are vertical and are labelled +/-1, +/-3, +/-5 and +/-7 respectively. Ideally, each landing point would be on one of eight vertical lines. In practice, however, due to impairments in the path from the modulator to the test point, the landing points do not all lie on the vertical lines but are, on the contrary, distributed along the eight lines in bands or elongated clouds, as shown in FIG. 2. The distribution of the landing points can be used to diagnose problems in, for example, the transmitter. However, interpretation of the constellation diagram has hitherto been rather subjective because it can be difficult to discern patterns in the clouds of landing points.

SUMMARY OF THE INVENTION

In accordance with a first aspect of the present invention there is provided a method of generating a constellation display of symbol landing points along I and Q axes in a complex plane, wherein the landing points are in a band extending along a line parallel to the Q axis, by processing the coordinates of the landing points to generate a curve that optimally fits the landing points under a selected criterion, and displaying the curve in the complex plane.

In accordance with a second aspect of the present invention there is provided a modulation analyzer, for generating a constellation display of symbol landing points along I and Q axes in a complex plane, wherein the landing points are distributed along a line parallel to the Q axis, having a processor which processes the coordinates of the landing points to generate a curve that optimally fits the landing points under a selected criterion, and a display device which displays the curve in the complex plane.

In accordance with a third aspect of the present invention there is provided apparatus for testing a vestigial sideband digital transmission system employing eight-level amplitude modulation, having a front end for deriving I and Q values for symbol landing points in a complex plane, wherein the landing points are in eight elongated bands distributed along respective lines parallel to the Q axis, a smoothing processor which processes the I and Q values for the landing points to generate eight curves that optimally fit the landing points in the eight bands respectively under a selected criterion, and a display device which displays the curves in the complex plane.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF THE PREFERRED EMBODIMENT

Figure 1:
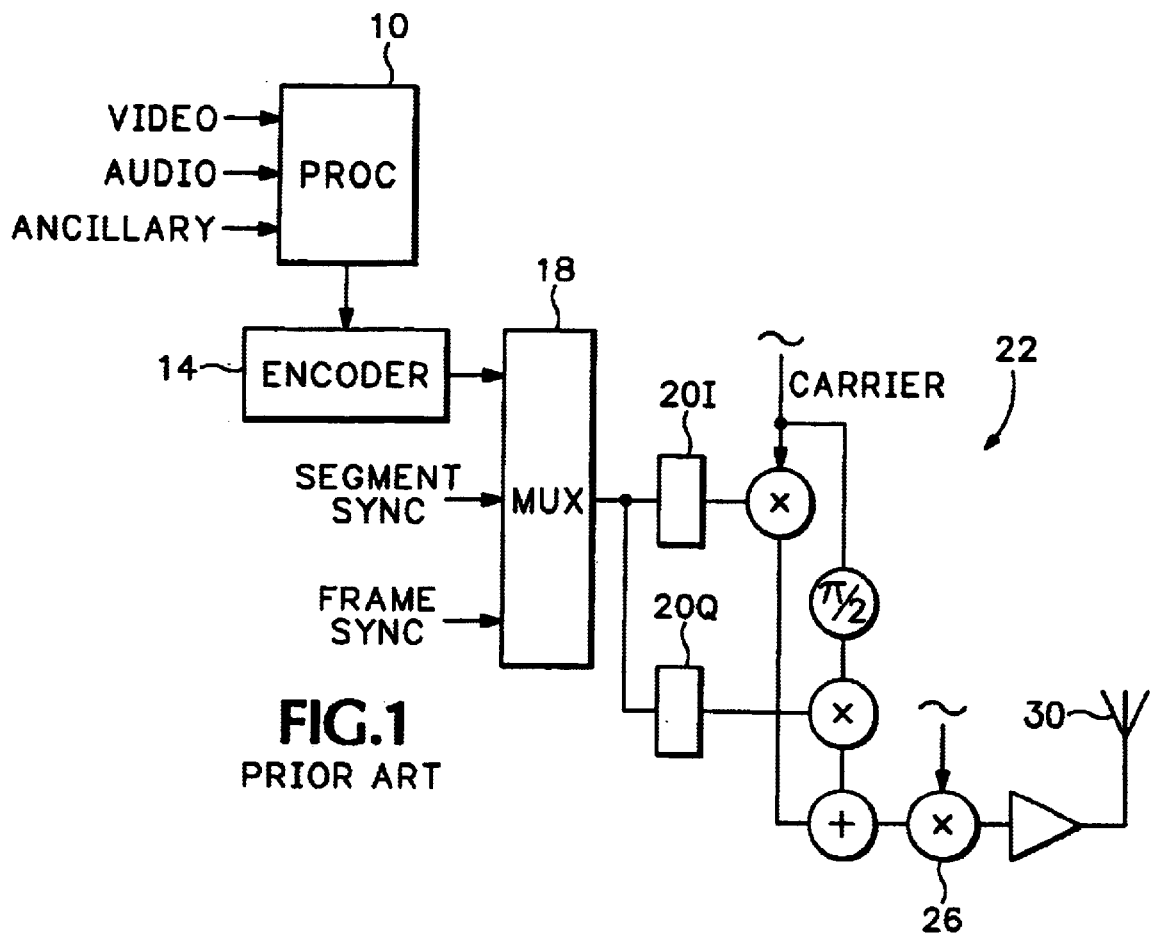
FIG. 1 is a simplified block diagram illustrating a conventional television transmission system.
Figure 3:
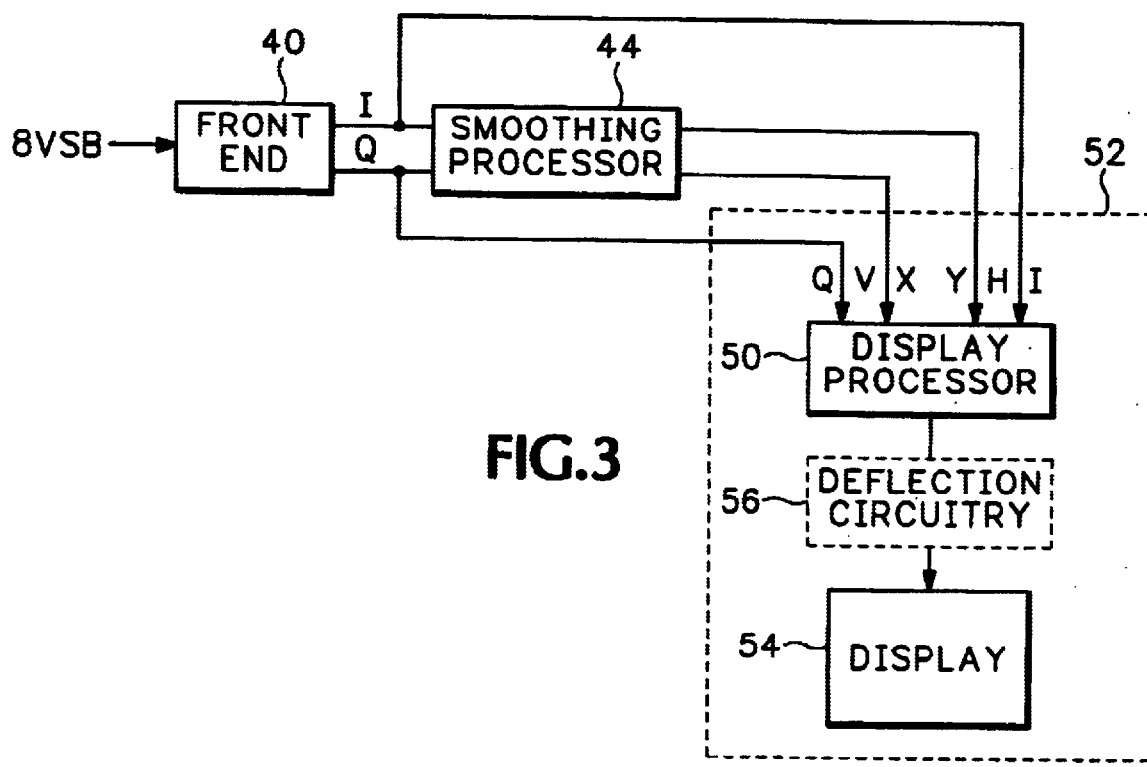
FIG. 3 is a schematic block diagram of a modulation analyzer in accordance with the present invention.

The modulation analyzer shown in FIG. 3 has a front end 40 with an input terminal for receiving an 8VSB signal. The functionality of the front end 40 depends on the location of the test point at which the signal being analyzed is acquired. For example, if the test point is at the output of the RF modulator 26 (FIG. 1), the front end would include a downconverter for downconverting the RF signal to an intermediate frequency, a digitizer for digitizing the IF signal, a demodulator which separates the digitized IF data streams into its I and Q components, and an equalizer which equalizes the I and Q components. The modulation analyzer has output terminals at which it provides, for each symbol, a pair of values (I, Q) specifying the landing point in the (I, Q) plane. The output terminals of the front end are connected to a smoothing processor 44 and to a display processor 50 in display device 52.

The modulation analyzer also includes a display 54, such as a cathode ray tube, liquid crystal display, or the like. Horizontal and vertical deflection circuitry 56 would be included for displays generating a raster scan display. The display processor 50 receives ordered pairs of values (I, Q) from the front end 40 and selectively receives ordered pairs of (x, y) values from the smoothing processor 44 and controls operation of display 54 directly or via the deflection circuitry 56 for raster scan displays so that a pixel at each location (H, V) is addressed.

In accordance with the invention, the smoothing processor 44 divides the landing points {I, Q} from a block of symbols (e.g. all 832 symbols) in one segment of data into eight sets in accordance with the I value. For example, one of the sets contains all landing points for which I is less than or equal to the lowest slice level (−6 on the scale in FIG. 2) and another set contains all landing points for which I is greater than the lowest slice level (−6) and less than or equal to the next higher slice level (−4). The coordinates (y, x) of each landing point in a given set are supplied as inputs to a curve fitting algorithm, which generates coefficients for the polynomial which best fits all the landing points in the set based on a least sum of square error (LS) criterion. The polynomial may be, for example, a third order polynomial, in which case the polynomial function is given by:

$$y = a_0 + a_1 x + a_2 x^2 + a_3 x^3 \qquad (1)$$

where x represents the Q values and y represents the I values.

For a set of N landing points, the set of equations for deriving the LS solution of the third order polynomial is given by:

$$\begin{bmatrix} y(1) \\ y(2) \\ \ldots \\ y(N) \end{bmatrix} = \begin{bmatrix} 1 & x(1) & x(1)^2 & x(1)^3 \\ 1 & x(2) & x(2)^2 & x(2)^3 \\ \ldots & \ldots & \ldots & \ldots \\ 1 & x(N) & x(N)^2 & x(N)^3 \end{bmatrix} \begin{bmatrix} a_0 \\ a_1 \\ a_2 \\ a_3 \end{bmatrix} \qquad (2)$$

$$Y = Xa$$

For a single set of data, the LS solution is given by $$a = (X^T X)^{-1} X^T Y.$$

The processor 44 solves Equation 2 to provide the coefficients $a_0$, $a_1$, $a_2$ and $a_3$ and uses the coefficients to generate ordered pairs (y,x) along the fitting curve in accordance with Equation 1.

Figure 2:
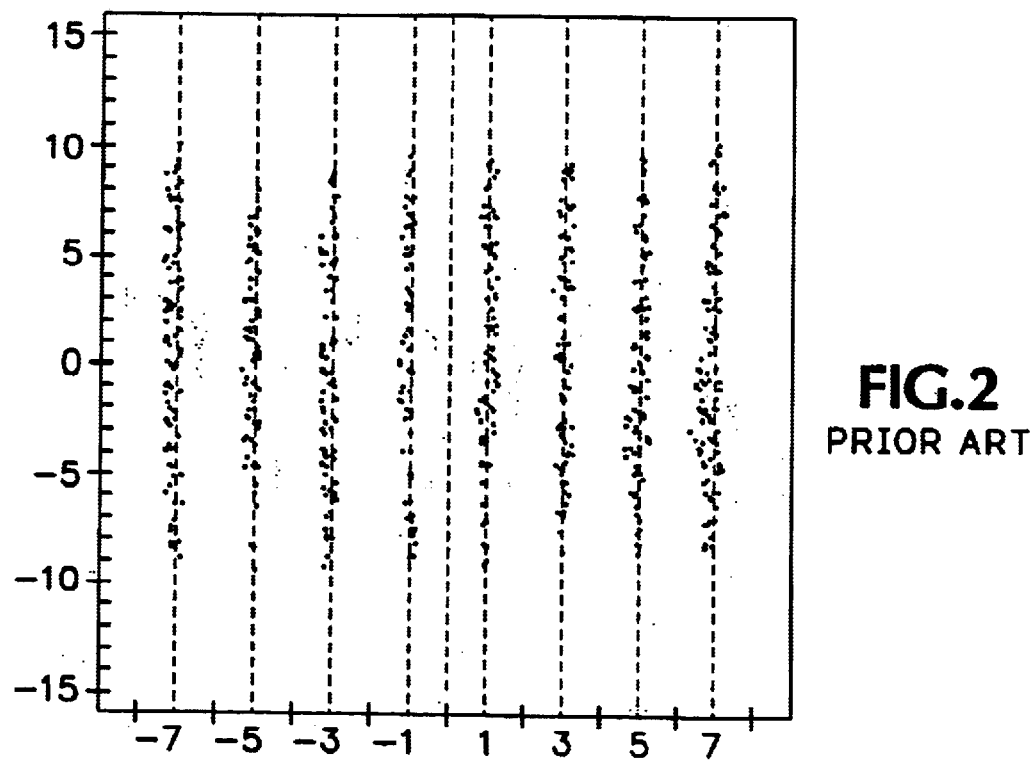
FIG. 2 shows a conventional 8VSB constellation display.

The I values and the Q values are provided to the display processor 50 for producing the traditional constellation display as shown in FIG. 2 and the smoothing processor 44 supplies the x and the y values to the display processor 50 for producing the curve fitted to the landing points. Depending on user controls, the display processor 50 provides the traditional constellation display, an enhanced constellation display showing, for each set of landing points, both the individual landing points and the polynomial curve generated by fitting the landing points in accordance with the LS criterion described above, as shown in FIG. 4, or the polynomial curve.

Figure 4:
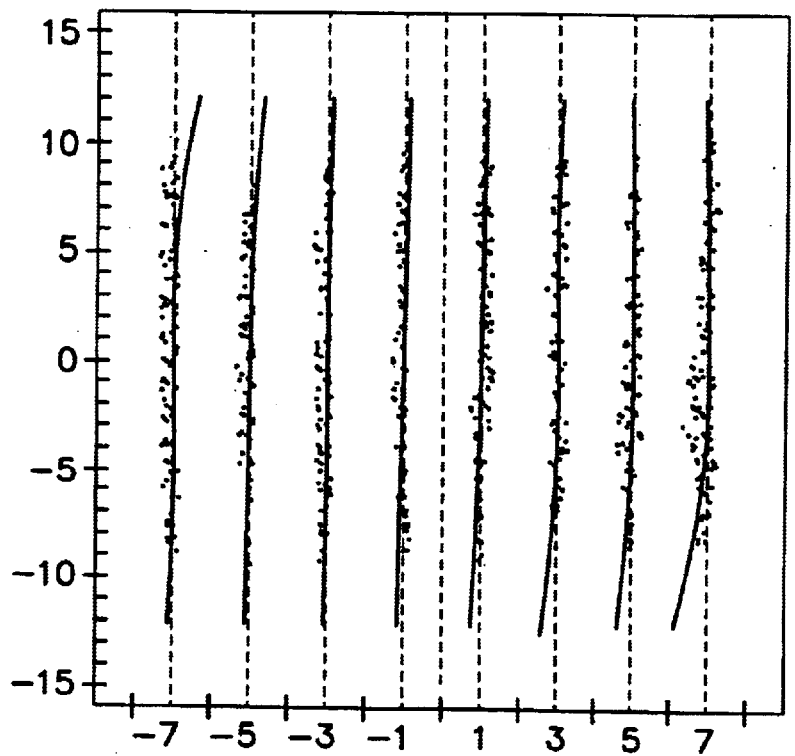
FIG. 4 shows a constellation display obtained by a method in accordance with the present invention.

The enhanced constellation display shown in FIG. 4 was generated using the same data set as that used for generating the display shown in FIG. 2. The added lines in FIG. 4 show, for example, that the symbols whose landing points are between zero and +2 are a good fit to a straight line, whereas the symbols whose landing points are between −8 and −6 are distributed in accordance with a pronounced S-shaped curve. A possible reason for this departure from a straight line would be non-linearity in the behavior of the transmitter, and accordingly the constellation display serves as a tool to suggest to a technician where further measurements or investigations should be made in order to locate a malfunction.

It may be desirable to generate the added lines based on the locations of landing points over several data segments. For a single set of data $$Y = Xa$$

and $$a = (X^T X)^{-1} X^T Y.$$

If $$r = X^T X$$

and $$S = X^T Y$$

then $$a = r^{-1} s.$$

Over k sets of data, $$\begin{bmatrix} Y_1 \\ Y_2 \\ \ldots \\ Y_k \end{bmatrix} = \begin{bmatrix} X_1 \\ X_2 \\ \ldots \\ X_k \end{bmatrix} a$$

and $$a = \left( \sum_{i=1}^{k} X_i^T X_i \right)^{-1} \sum_{i=1}^{k} X_i^T Y_i = \left( \sum_{k=1}^{k} r_i \right)^{-1} \sum_{k=1}^{k} s_i = R_k^1 S_k \qquad (3)$$

$$= (R_{k-1} + r_k) \cdot (S_{k-1} + s_k)$$

where $R_k$ and $S_k$ are values of r and s accumulated over k data sets.

Therefore, in order to calculate the coefficients a for k consecutive data sets it is not necessary to wait until all k data sets have been acquired before commencing the calculation, which would necessitate storing the k data sets and carrying out computations with a large volume of data, but it is on the contrary possible to calculate the coefficients a over k consecutive data sets by adding $r_k$ and $s_k$, for the kth data set, to $R_{k-1}$ and $S_{k-1}$ (which are accumulated over the previous k−1 sets), and then calculating a over the k data sets using Equation (3). Accordingly, storage and computational requirements are reduced, and it is relatively simple to display curves based on information derived from multiple segments.

It will be appreciated that the invention is not restricted to the particular embodiment that has been described, and that variations may be made therein without departing from the scope of the invention as defined in the appended claims and equivalents thereof For example, the functions and arrangement of the functional blocks shown in FIG. 3 were chosen in order to facilitate discussion of signal flow and the invention is not restricted to use of the specific functional blocks shown in FIG. 3, arranged and connected in the manner shown in FIG. 3. In particular, the functions of the smoothing processor and the display processor may be partitioned differently from the manner suggested by the way in which the respective blocks are shown in FIG. 3.

What is claimed is:

1. A method of generating a constellation display of symbol landing points along I and Q axes in a complex plane, wherein the landing points are in a band extending along a line parallel to the Q axis, comprising:

processing the coordinates of the landing points to generate a curve that optimally fits the landing points under a selected criterion, and displaying the curve in the complex plane.

2. A method according to claim 1, comprising displaying either the landing points or both the landing points and the curve in the complex plane.

3. A method according to claim 1, wherein the landing points are in first and second bands extending along at least first and second spaced parallel lines and the method comprises:

partitioning the coordinates of the landing points into first and second groups, which are clustered along the first and second lines respectively, separately processing the coordinates of the landing points in said first and second groups to generate first and second curves that optimally fit the landing points of the first and second groups respectively under said selected criterion, and displaying the first and second curves in the complex plane.

4. A method according to claim 1, comprising acquiring a first set of landing points in a first segment of a signal, acquiring a second set of landing points in a second segment of the signal, processing the coordinates of the first and second sets of landing points to generate a single curve that optimally fits the landing points of both sets under said selected criterion, and displaying the curve in the complex plane.

5. A method according to claim 1, wherein the symbol landing points are obtained by processing an 8VSB signal and the landing points are in eight bands extending along eight spaced parallel lines respectively and the method comprises:

partitioning the coordinates of the landing points into eight groups, which are clustered along the eight lines respectively, separately processing the coordinates of the landing points in said eight groups to generate eight curves that optimally fit the landing points of the eight groups respectively under said selected criterion, and displaying the eight curves in the complex plane.

6. A modulation analyzer, for generating a constellation display of symbol landing points along I and Q axes in a complex plane, wherein the landing points are distributed along a line parallel to the Q axis, comprising:

a processor which processes the coordinates of the landing points to generate a curve that optimally fits the landing points under a selected criterion, and a display device which displays the curve in the complex plane.

7. A modulation analyzer according to claim 6, wherein the display device is operative selectively to display either the landing points or both the landing points and the curve.

8. A modulation analyzer according to claim 6, for generating a constellation display for an 8VSB signal, wherein the processor partitions the landing points into eight groups in accordance with the I values of the landing points and generates eight curves which optimally fit the landing points of the respective groups under said selected criterion and the display device displays the eight curves in the complex plane.

9. Apparatus for testing a vestigial sideband digital transmission system employing eight-level amplitude modulation, comprising:

a front end for deriving I and Q values for symbol landing points in a complex plane, wherein the landing points are in eight elongate bands distributed along respective lines parallel to the Q axis, a smoothing processor which processes the I and Q values for the landing points to generate eight curves that optimally fit the landing points in the eight bands respectively under a selected criterion, and a display device which displays the curves in the complex plane.

10. Apparatus according to claim 9, wherein the smoothing processor groups the landing points in accordance with I values and separately processes the coordinates of the eight groups of landing points to generate the eight curves.

11. Apparatus according to claim 9, comprising a selectively operable means for causing the display device to display either the landing points or both the landing points and the curves.

* * * * *